(12) United States Patent
Naitou et al.

(10) Patent No.: US 11,005,111 B2
(45) Date of Patent: May 11, 2021

(54) REDOX FLOW BATTERY, ELECTRICAL QUANTITY MEASUREMENT SYSTEM, AND ELECTRICAL QUANTITY MEASUREMENT METHOD

(71) Applicant: Sumitomo Electric Industries, Ltd., Osaka (JP)

(72) Inventors: Yasuhiro Naitou, Osaka (JP); Yongrong Dong, Osaka (JP); Hideki Miyawaki, Osaka (JP); Yoshiyasu Kawagoe, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 312 days.

(21) Appl. No.: 16/314,476

(22) PCT Filed: Jun. 16, 2017

(86) PCT No.: PCT/JP2017/022348
§ 371 (c)(1),
(2) Date: Dec. 31, 2018

(87) PCT Pub. No.: WO2018/003554
PCT Pub. Date: Jan. 4, 2018

(65) Prior Publication Data
US 2019/0165384 A1     May 30, 2019

(30) Foreign Application Priority Data

Jul. 1, 2016  (JP) .............................. JP2016-131827

(51) Int. Cl.
*H01M 8/0234* (2016.01)
*H01M 8/02* (2016.01)
(Continued)

(52) U.S. Cl.
CPC ........... *H01M 8/0234* (2013.01); *H01M 8/02* (2013.01); *H01M 8/04194* (2013.01);
(Continued)

(58) Field of Classification Search
None
See application file for complete search history.

(56) References Cited

U.S. PATENT DOCUMENTS

2016/0013506 A1* 1/2016 Dong ...................... H01M 8/20
429/418

FOREIGN PATENT DOCUMENTS

| CN | 103943876 | 7/2014 |
|---|---|---|
| JP | 09-101286 A | 4/1997 |
| WO | 2015066398 A1 | 5/2015 |

* cited by examiner

*Primary Examiner* — Wyatt P McConnell
(74) *Attorney, Agent, or Firm* — Xsensus LLP (57) ABSTRACT

A redox flow battery includes a battery cell to which a positive electrolyte and a negative electrolyte are supplied, and an electrical quantity measurement system configured to measure a quantity of electricity when a predetermined amount of electrolyte is discharged, for at least one of the positive electrolyte and the negative electrolyte. The electrical quantity measurement system includes an electrolytic cell having a working electrode to which one of the positive electrolyte and the negative electrolyte, in which the quantity of electricity is to be measured, is supplied, and a counter electrode to which the other electrolyte, which is not to be measured, is supplied; a standard electrode disposed, outside the electrolytic cell, so as to be in contact with the one electrolyte to be measured; and a measurement device configured to apply, to the electrolytic cell, a voltage that is set on the basis of a potential of the standard electrode and capable of performing total electrolysis of the one electro- (Continued)

lyte contained in the working electrode and measure the quantity of electricity of the one electrolyte.

20 Claims, 6 Drawing Sheets

(51) Int. Cl.
    *H01M 8/18*           (2006.01)
    *H01M 8/04186*     (2016.01)
    *H01M 8/241*         (2016.01)

(52) U.S. Cl.
    CPC .............. *H01M 8/18* (2013.01); *H01M 8/188* (2013.01); *H01M 8/241* (2013.01); *Y02E 60/50* (2013.01)

REDOX FLOW BATTERY, ELECTRICAL QUANTITY MEASUREMENT SYSTEM, AND ELECTRICAL QUANTITY MEASUREMENT METHOD

TECHNICAL FIELD

The present invention relates to a redox flow battery, an electrical quantity measurement system, and an electrical quantity measurement method.

The present application is based upon and claims the benefit of priority from Japanese Patent Application No. 2016-131827, filed Jul. 1, 2016, the entire contents of which are incorporated herein by reference.

BACKGROUND ART

As a storage battery, a redox flow battery (hereinafter, may be referred to as the "RF battery"), such as the one described in Patent Literature 1, is known, in which a battery reaction is conducted by supplying electrolytes to electrodes.

Patent Literature 1 discloses that in order to efficiently operate an RF battery with high reliability, the quantity of electricity is measured by a coulometric method, and the state of charge (SOC) is grasped on the basis of the measured quantity of electricity. Furthermore, Patent Literature 1 discloses that a three-electrode electrolytic cell including a working electrode, a counter electrode, and a reference electrode is used for measuring the quantity of electricity, and a Ag/AgCl electrode is used as the reference electrode.

CITATION LIST

Patent Literature

PTL 1: Japanese Unexamined Patent Application Publication No. 9-101286

SUMMARY OF INVENTION

A redox flow battery according to an embodiment of the present disclosure includes a battery cell to which a positive electrolyte and a negative electrolyte are supplied, and an electrical quantity measurement system configured to measure a quantity of electricity when a predetermined amount of electrolyte is discharged, for at least one of the positive electrolyte and the negative electrolyte. The electrical quantity measurement system includes an electrolytic cell having a working electrode to which one of the positive electrolyte and the negative electrolyte, in which the quantity of electricity is to be measured, is supplied, and a counter electrode to which the other electrolyte, which is not to be measured, is supplied; a standard electrode disposed, outside the electrolytic cell, so as to be in contact with the one electrolyte to be measured; and a measurement device configured to apply, to the electrolytic cell, a voltage that is set on the basis of a potential of the standard electrode and capable of performing total electrolysis of the one electrolyte contained in the working electrode and measure the quantity of electricity of the one electrolyte.

An electrical quantity measurement system according to an embodiment of the present disclosure, which is configured to measure a quantity of electricity when a predetermined amount of electrolyte is discharged, for at least one of a positive electrolyte and a negative electrolyte supplied to a battery cell of a redox flow battery, includes an electrolytic cell having a working electrode to which one of the positive electrolyte and the negative electrolyte, in which the quantity of electricity is to be measured, is supplied, and a counter electrode to which the other electrolyte, which is not to be measured, is supplied; a standard electrode disposed, outside the electrolytic cell, so as to be in contact with the one electrolyte to be measured; and a measurement device configured to apply, to the electrolytic cell, a voltage that is set on the basis of a potential of the standard electrode and capable of performing total electrolysis of the one electrolyte contained in the working electrode and measure the quantity of electricity of the one electrolyte.

An electrical quantity measurement method according to an embodiment of the present disclosure includes a step of supplying one of a positive electrolyte and a negative electrolyte supplied to a battery cell of a redox flow battery to a working electrode which constitutes an electrolytic cell that is independent from the battery cell, and supplying the other electrolyte to a counter electrode which constitutes the electrolytic cell, and a step of measuring a quantity of electricity when the one electrolyte contained in the working electrode is discharged by applying a set voltage to the electrolytic cell having the electrolytes supplied thereto. The set voltage is a voltage that is based on a potential of a standard electrode disposed, outside the electrolytic cell, so as to be in contact with the one electrolyte and capable of performing total electrolysis of the one electrolyte contained in the working electrode.

DESCRIPTION OF EMBODIMENTS

Problems to be Solved by the Present Disclosure

When a redox flow battery is used for a long period of time, it is desired to accurately monitor the state of charge (SOC) over a long period of time.

Figure 5:
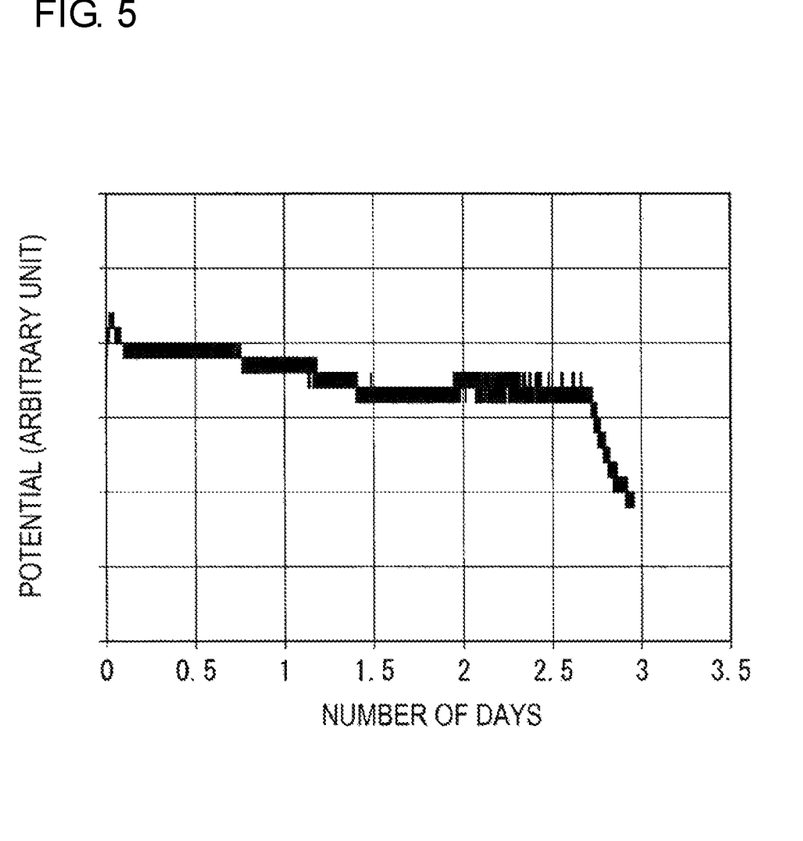
FIG. 5 is a graph showing the change in potential with time in a Ag/AgCl electrode.

In an existing coulometric method using a three-electrode electrolytic cell, the quantity of electricity can be measured with high accuracy. Accordingly, the SOC can be obtained with high accuracy on the basis of the measured quantity of electricity, and the SOC can be accurately grasped. However, a Ag/AgCl electrode is not suited for long-term use. The reason for this is that, in the Ag/AgCl electrode, mixing of the internal solution thereof into the electrolyte (contamination) with time is unavoidable, and as shown in FIG. 5, the potential of the Ag/AgCl electrode suddenly decreases in about two to three days, and the Ag/AgCl electrode cannot be substantially used as a reference electrode. In the graph of FIG. 5, the horizontal axis represents the number of days elapsed (days), and the vertical axis represents the potential (arbitrary unit) (the same applies to the graph of FIG. 6 which will be described later).

Figure 6:
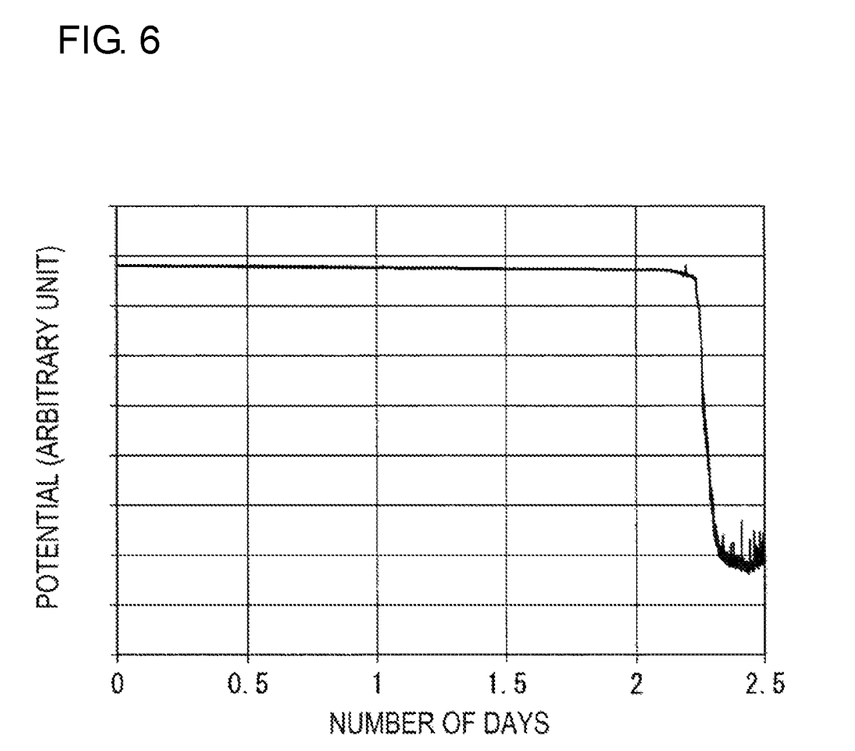
FIG. 6 is a graph showing the change in potential with time in a $Hg/Hg_2SO_4$ electrode.

A $Hg/Hg_2SO_4$ electrode is another example of an existing reference electrode. In the $Hg/Hg_2SO_4$ electrode, as in the Ag/AgCl electrode, as shown in FIG. 6, the potential suddenly decreases in about two to three days, and therefore, the $Hg/Hg_2SO_4$ electrode is not suited for long-term use.

Examples of other existing SOC measurement methods include a method using a circuit voltage. However, the coulometric method is preferable from the viewpoint of measurement precision and accuracy. Furthermore, depending on the kind of electrolyte (kind of active material), operating conditions, and the like, a large difference may occur between the SOC of the positive electrolyte and the SOC of the negative electrolyte, and it is desired to adjust operating conditions and the like before a large difference occurs. Therefore, it is desired to be able to grasp the SOC of the positive electrolyte and the SOC of the negative electrolyte separately. The coulometric method can meet such a requirement. From this viewpoint also, the coulometric method is expected to be preferable.

Accordingly, it is an object of the present invention to provide a redox flow battery in which the state of charge can be accurately monitored over a long period of time. Furthermore, it is another object of the present invention to provide an electrical quantity measurement system and an electrical quantity measurement method which can be used to monitor the state of charge of a redox flow battery over a long period of time.

Advantageous Effects of the Present Disclosure

In a redox flow battery according to an embodiment of the present disclosure, the state of charge can be accurately monitored over a long period of time.

Furthermore, an electrical quantity measurement system according to an embodiment of the present disclosure and an electrical quantity measurement method according to an embodiment of the present disclosure can be used to monitor the state of charge of a redox flow battery over a long period of time.

Description of Embodiments of the Present Invention

First, the contents of embodiments of the present invention will be enumerated and described.

(1) A redox flow battery (RF battery) according to an embodiment of the present invention includes a battery cell to which a positive electrolyte and a negative electrolyte are supplied, and an electrical quantity measurement system configured to measure a quantity of electricity when a predetermined amount of electrolyte is discharged, for at least one of the positive electrolyte and the negative electrolyte. The electrical quantity measurement system includes an electrolytic cell having a working electrode to which one of the positive electrolyte and the negative electrolyte, in which the quantity of electricity is to be measured, is supplied, and a counter electrode to which the other electrolyte, which is not to be measured, is supplied; a standard electrode disposed, outside the electrolytic cell, so as to be in contact with the one electrolyte to be measured; and a measurement device configured to apply, to the electrolytic cell, a voltage that is set on the basis of a potential of the standard electrode and capable of performing total electrolysis of the one electrolyte contained in the working electrode and measure the quantity of electricity of the one electrolyte.

In the RF battery, without using a commonly used reference electrode, such as a Ag/AgCl electrode or $Hg/Hg_2SO_4$ electrode, the quantity of electricity of the electrolyte is measured by a coulometric method using, as a quasi-reference electrode, the standard electrode and the electrolyte in which the state of charge (SOC) is to be measured. In such an RF battery, unlike the case where a commonly used reference electrode is used, the problem, such as the mixing of the internal solution of the reference electrode, does not occur, and in measuring the quantity of electricity, a reference potential that regulates the potential of the working electrode can be appropriately obtained over a long period of time. The reference potential is the potential of the standard electrode and the potential of the electrolyte in contact with the standard electrode. By applying, to the electrolytic cell, a voltage that is set on the basis of the potential of the standard electrode and capable of performing total electrolysis, the electrolyte (a predetermined amount of electrolyte) contained in the working electrode can be discharged neither excessively nor insufficiently. As a result, the quantity of electricity of the predetermined amount of electrolyte can be measured with high accuracy. Since the SOC is obtained by computation using the measured quantity of electricity (refer to the formula α which will be described later), the SOC can be obtained with high accuracy. Consequently, in the RF battery, the SOC can be accurately monitored, over a long period of time, on the basis of the measured quantity of electricity. Furthermore, since the RF battery is configured such that a part of the electrolyte supplied to the battery cell (in a very small amount as will be described later) is supplied to the electrolytic cell for use, the quantity of electricity can be continuously measured in-line, which is also suitable for monitoring the SOC. Furthermore, for the reason that the electrolyte used for measuring the quantity of electricity can be reused as a feed solution to the battery cell, the RF battery is suited for long-term use. Note that the expression "voltage that is capable of performing total electrolysis" means a voltage that can certainly set the SOC to 0%.

(2) According to an exemplary embodiment of the RF battery, the standard electrode includes a plate made of a composite material containing a carbon material and an organic material.

The composite material has excellent resistance to electrolyte. Therefore, in the embodiment described above, the replacement frequency of the standard electrode can be reduced, and the standard electrode can be used over a long period of time.

(3) According to an exemplary embodiment of the RF battery, the positive electrolyte contains manganese ions.

In the embodiment described above, since manganese ions are contained as a positive electrode active material, although depending on the negative electrode active material, it is possible to construct an RF battery having a higher electromotive force than that of a V (vanadium)-based RF battery described in Patent Literature 1.

(4) According to an exemplary embodiment of the RF battery, the negative electrolyte contains titanium ions.

In the embodiment described above, since titanium ions are contained as a negative electrode active material, although depending on the positive electrode active material, it is possible to construct an RF battery having a higher electromotive force than that of the V-based RF battery.

(5) An electrical quantity measurement system according to an embodiment of the present invention, which is configured to measure a quantity of electricity when a predetermined amount of electrolyte is discharged, for at least one of a positive electrolyte and a negative electrolyte supplied to a battery cell of a redox flow battery, includes an electrolytic cell having a working electrode to which one of the positive electrolyte and the negative electrolyte, in which the quantity of electricity is to be measured, is supplied, and a counter electrode to which the other electrolyte, which is not to be measured, is supplied; a standard electrode disposed, outside the electrolytic cell, so as to be in contact with the one electrolyte to be measured; and a measurement device configured to apply, to the electrolytic cell, a voltage that is set on the basis of a potential of the standard electrode and capable of performing total electrolysis of the one electrolyte contained in the working electrode and measure the quantity of electricity of the one electrolyte.

In the electrical quantity measurement system, without using the commonly used reference electrode, the quantity of electricity of the electrolyte is measured by a coulometric method using, as a quasi-reference electrode, the standard electrode and the electrolyte of the RF battery in which the SOC is to be measured. By incorporating the electrical quantity measurement system into an RF battery, as described above, in measuring the quantity of electricity, a reference potential that regulates the potential of the working electrode can be appropriately obtained over a long period of time, and the electrolyte (a predetermined amount of electrolyte) contained in the working electrode can be discharged neither excessively nor insufficiently. As a result, the quantity of electricity can be measured with high accuracy. Furthermore, as described above, the SOC can be obtained with high accuracy. Accordingly, the electrical quantity measurement system can be used to monitor the SOC over a long period of time by being incorporated into an RF battery.

(6) An electrical quantity measurement method according to an embodiment of the present invention includes a step of supplying one of a positive electrolyte and a negative electrolyte supplied to a battery cell of a redox flow battery to a working electrode which constitutes an electrolytic cell that is independent from the battery cell, and supplying the other electrolyte to a counter electrode which constitutes the electrolytic cell, and a step of measuring a quantity of electricity when the one electrolyte contained in the working electrode is discharged by applying a set voltage to the electrolytic cell having the electrolytes supplied thereto. The set voltage is a voltage that is based on a potential of a standard electrode disposed, outside the electrolytic cell, so as to be in contact with the one electrolyte and capable of performing total electrolysis of the one electrolyte contained in the working electrode.

In the electrical quantity measurement method, without using the commonly used reference electrode, the quantity of electricity of the electrolyte is measured by a coulometric method using, as a quasi-reference electrode, the standard electrode and the electrolyte of the RF battery in which the SOC is to be measured. In the electrical quantity measurement method, in measuring the quantity of electricity of the electrolyte, a reference potential that regulates the potential of the working electrode can be appropriately obtained over a long period of time, and the electrolyte contained in the working electrode can be discharged neither excessively nor insufficiently. As a result, the quantity of electricity can be measured with high accuracy. Furthermore, as described above, the SOC can be obtained with high accuracy. Accordingly, the electrical quantity measurement method can be used to monitor the SOC over a long period of time. In carrying out the electrical quantity measurement method, for example, the electrical quantity measurement system according to item (5) can be suitably used.

Detailed Description of Embodiments of the Present Invention

Specific examples of a redox flow battery (RF battery) according to an embodiment of the present invention, an electrical quantity measurement system according to an embodiment, and an electrical quantity measurement method according to an embodiment will be described, with reference to the drawings appropriately. In the drawings, the same reference signs denote the same components.

Embodiment 1

Figure 1:
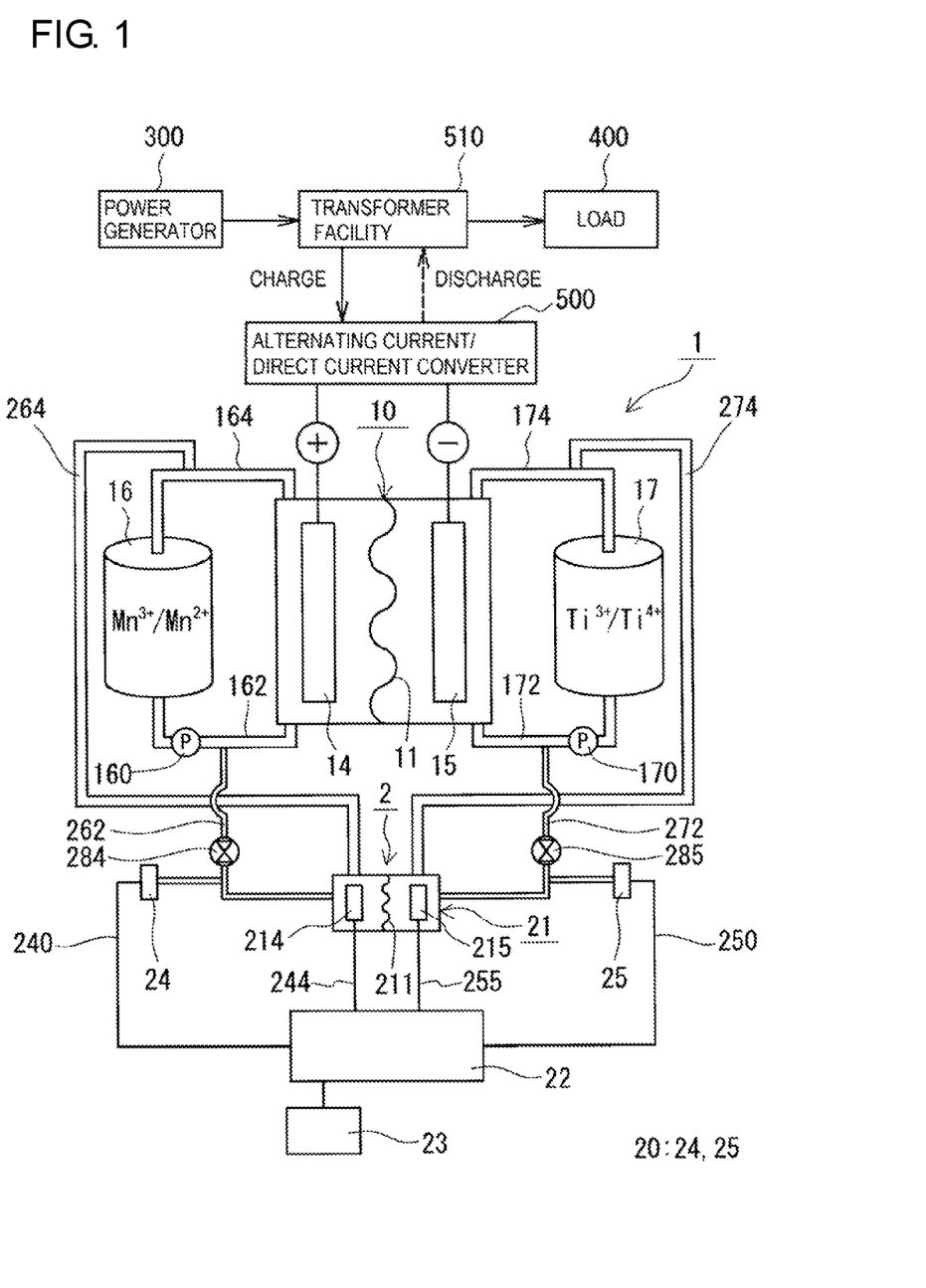
FIG. 1 is a schematic diagram of a redox flow battery according to Embodiment 1.
Figure 2:
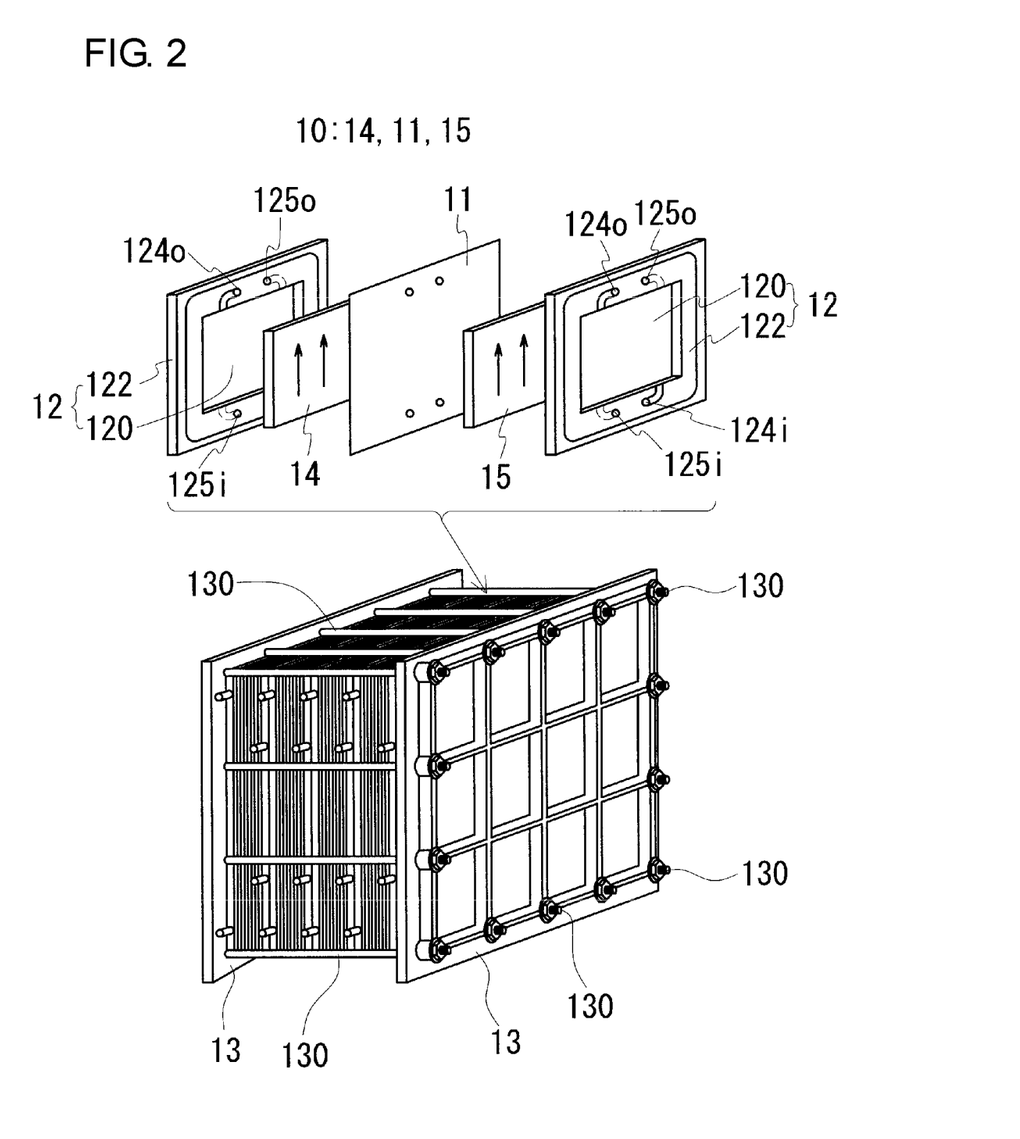
FIG. 2 is a schematic diagram showing an example of a cell stack included in a redox flow battery according to Embodiment 1.

With reference to FIGS. 1 and 2, an RF battery 1 according to Embodiment 1 and an electrical quantity measurement system 2 according to Embodiment 1 will be described. In FIG. 1, ions shown inside a positive electrolyte tank 16 and a negative electrolyte tank 17 are examples of ion species contained in the positive and negative electrolytes.

(Overview of RF Battery)

The RF battery 1 according to Embodiment 1 includes a battery cell 10 to which a positive electrolyte and a negative electrolyte are supplied, and an electrical quantity measurement system 2 (electrical quantity measurement system 2 according to Embodiment 1) configured to measure a quantity of electricity when a predetermined amount of electrolyte is discharged, for at least one of the positive electrolyte and the negative electrolyte. Furthermore, the RF battery 1 generally includes a circulation mechanism for circulating and supplying the positive electrolyte and the negative electrolyte to the battery cell 10. Such an RF battery 1 is typically connected, through an alternating current/direct current converter 500, a transformer facility 510, and the like, to a power generation unit 300 and a load 400, such as a power system or consumer. The RF battery 1 performs charging with the power generation unit 300 being used as an electric power supply source, and performs discharging with the load 400 being used as an electric power supply target. Examples of the power generation unit 300 include solar photovoltaic power generators, wind power generators, and other general power plants.

The RF battery 1 according to Embodiment 1 includes the electrical quantity measurement system 2, measures the quantity of electricity of the electrolyte by a coulometric method, and the measured quantity of electricity is used as a parameter for monitoring the SOC. The RF battery 1 includes a standard electrode 20 disposed so as to be in contact with the electrolyte in which the quantity of electricity is to be measured, and one of the characteristics is that the electrolyte to be measured and the standard electrode 20 are used as a quasi-reference electrode. First, an example of the battery cell 10 and the circulation mechanism for the electrolytes will be described, and next, the electrical quantity measurement system 2 and the electrical quantity measurement method will be described.

(Battery Cell)

The battery cell 10 includes a positive electrode 14 to which the positive electrolyte is supplied, a negative electrode 15 to which the negative electrolyte is supplied, and a membrane 11 interposed between the positive electrode 14 and the negative electrode 15.

The positive electrode 14 and the negative electrode 15 are reaction sites to which the electrolytes are supplied and in which active materials (ions) perform battery reactions. Porous bodies, such as fiber aggregates of a carbon material, can be used as the electrodes.

The membrane 11 is a member that separates the positive electrode 14 and the negative electrode 15 from each other and also allows certain ions to permeate therethrough. An ion-exchange membrane or the like can be used as the membrane 11.

The battery cell 10 is typically constructed by using cell frames 12 shown in FIG. 2.

A cell frame 12 includes a bipolar plate 120 and a frame body 122 that surrounds the periphery of the bipolar plate 120. The bipolar plate 120 has a surface on which a positive electrode 14 is disposed and another surface on which a negative electrode 15 is disposed, and is a conductive member that conducts an electric current but does not pass electrolytes therethrough. The frame body 122 is an insulating member which is provided with supply passages for supplying electrolytes to the positive electrode 14 and the negative electrode 15 disposed on the surfaces of the bipolar plate 120, and drainage passages for draining the electrolytes from the positive electrode 14 and the negative electrode 15. The supply passages include liquid supply holes 124i and 125i, slits extending from the liquid supply holes 124i and 125i to the inner edge, and the like. The drainage passages include liquid drainage holes 124o and 125o, slits extending from the inner edge to the liquid drainage holes 124o and 125o, and the like. For example, a conductive plastic plate containing a carbon material, such as graphite, and an organic material can be used as the bipolar plate 120. As a constituent material for the frame body 122, for example, an insulating resin, such as vinyl chloride, may be used. FIG. 2 illustrates the membrane 11, the positive electrode 14, the negative electrode 15, and the bipolar plate 120, all of which are rectangular-shaped, and the frame body 122 which is rectangular frame-shaped. However, the shapes can be appropriately changed.

Although a single-cell battery including a single battery cell 10 is shown in FIG. 1, typically, a multi-cell battery including a plurality of battery cells 10 is used. In the multi-cell battery, a configuration referred to as a cell stack shown in FIG. 2 is used.

The cell stack typically includes a layered body in which a cell frame 12, a positive electrode 14, a membrane 11, and a negative electrode 15 are stacked in this order repeatedly, a pair of end plates 13 which sandwich the layered body, and fastening members, including joining members 130, such as long bolts, which join between the end plates 13, and nuts. The fastening members fasten between the end plates 13, and thus the stacked state is maintained. Regarding cell frames located at both ends in the stacking direction of battery cells 10 in the cell stack, cell frames in each of which, instead of a bipolar plate 120, a current collector plate is disposed are used.

(Circulation Mechanism)

The circulation mechanism includes, as shown in FIG. 1, a positive electrolyte tank 16 which stores a positive electrolyte to be circulated and supplied to the positive electrode 14, a negative electrolyte tank 17 which stores a negative electrolyte to be circulated and supplied to the negative electrode 15, pipes 162 and 164 which connect between the positive electrolyte tank 16 and the battery cell 10, pipes 172 and 174 which connect between the negative electrolyte tank 17 and the battery cell 10, and pumps 160 and 170 provided, respectively, on the pipes 162 and 172 on the supply side to the battery cell 10. The pipes 162, 164, 172, and 174 are connected to their respective electrolyte flow ducts formed by liquid supply holes 124i and 125i and liquid drainage holes 124o and 125o of a plurality of stacked cell frames 12, and thus, circulation paths of the positive and negative electrolytes are formed.

Regarding the basic configurations, constituent materials, and the like of the battery cell 10 and the circulation mechanism, known configurations, materials, and the like can be appropriately used.

(Electrolyte)

As the electrolyte supplied to the battery cell 10, for example, an aqueous solution containing an active material, such as metal ions or non-metal ions, and at least one acid or acid salt selected from the group consisting of sulfuric acid, phosphoric acid, nitric acid, hydrochloric acid, and salts thereof can be used. One example of the positive electrolyte may contain manganese (Mn) ions as a positive electrode active material. In this case, for example, the negative electrolyte may contain, as a negative electrode active material, at least one species of ions selected from the group consisting of titanium (Ti) ions, vanadium (V) ions, chromium (Cr) ions, zinc (Zn) ions, chlorine (Cl) ions, bromine (Br) ions, and tin (Sn) ions. One example of the negative electrolyte may contain titanium ions as a negative electrode active material. In this case, for example, the positive electrolyte may contain, as a positive electrode active material, at least one species of ions selected from the group consisting of manganese ions, vanadium ions, iron (Fe) ions, cerium (Ce) ions, and cobalt (Co) ions. In particular, in the case of a Mn/Ti-based RF battery provided with Mn/Ti-based electrolytes in which the positive electrolyte contains manganese ions and the negative electrolyte contains titanium ions, it is possible to obtain an RF battery having a higher electromotive force than that of the V-based RF battery described in Patent Literature 1. Other examples include V-based electrolytes (V-based RF battery) containing vanadium (V) ions having different valences as a positive electrode active material and a negative electrode active material, and Fe/Cr-based electrolytes (Fe/Cr-based RF battery) containing iron (Fe) ions as a positive electrode active material and chromium (Cr) ions as a negative electrode active material. That is, known electrolytes used in RF batteries can be used.

In a Mn/Ti-based RF battery or the like, long-term use can cause a difference between the SOC of the positive electrolyte and the SOC of the negative electrolyte. Even in such a case, when the electrical quantity measurement system or electrical quantity measurement method according to Embodiment 1 is used, for example, by measuring the quantity of electricity of the positive electrolyte and monitoring the SOC of the positive electrolyte, operating conditions and the like can be adjusted before a large difference occurs. In the case where the SOCs of both electrodes are monitored, as shown in FIG. 1, a standard electrode 24 in contact with the positive electrolyte and a standard electrode 25 in contact with the negative electrolyte may be provided so that both the quantity of electricity of the positive electrolyte and the quantity of electricity of the negative electrolyte can be measured.

(Electrical Quantity Measurement Method)

In an electrical quantity measurement method according to Embodiment 1, by using an electrolytic cell 21 having a working electrode to which one of the positive electrolyte and the negative electrolyte supplied to the battery cell 10 of the RF battery 1, in which the SOC is to be monitored, is supplied, and a counter electrode to which the other electrolyte is supplied, the electrolytic cell 21 being independent from the battery cell 10, and a standard electrode 20 disposed, outside the electrolytic cell 21, so as to be in contact with the electrolyte, the quantity of electricity is measured when a predetermined amount of electrolyte is discharged, for the electrolyte in which the SOC is to be monitored. Particularly, the electrical quantity measurement method includes a step of supplying the one electrolyte to the working electrode which constitutes the electrolytic cell 21 and supplying the other electrolyte to the counter electrode which constitutes the electrolytic cell 21, and a step of measuring a quantity of electricity when the one electrolyte contained in the working electrode is discharged by applying a set voltage to the electrolytic cell 21 having the electrolytes supplied thereto. The set voltage is a voltage that is based on the potential of the standard electrode 20 disposed, outside the electrolytic cell 21, so as to be in contact with the one electrolyte and capable of performing total electrolysis of the one electrolyte contained in the working electrode. The set voltage may be set each time the quantity of electricity is measured or may be set in advance. In the case where the set voltage is set in advance, as will be described later, for example, by using the electrolyte in which the SOC is to be monitored and the standard electrode 20, a range of voltage that is capable of performing total electrolysis may be obtained by experiment, and the set voltage may be selected from this range. In the case where the set voltage is set each time the quantity of electricity is measured, for example, the current potential of the electrolyte may be obtained by using the standard electrode 20, and the voltage is appropriately adjusted within the range obtained by experiment. In carrying out the electrical quantity measurement method, the electrical quantity measurement system 2 described below can be suitably used. Therefore, the electrical quantity measurement method will be described in detail below in the section of the electrical quantity measurement system 2.

(Electrical Quantity Measurement System)

The electrical quantity measurement system 2, which is configured to measure a quantity of electricity when a predetermined amount of electrolyte is discharged, for at least one of the positive electrolyte and the negative electrolyte supplied to the battery cell 10 of the RF battery 1 in which the SOC is to be monitored, includes an electrolytic cell 21, a standard electrode 20, and a measurement device 22 which will be described below.

Electrolytic Cell

The electrolytic cell 21 includes a working electrode to which one of the positive electrolyte and the negative electrolyte, in which the quantity of electricity is to be measured, is supplied, and a counter electrode to which the other electrolyte, in which the quantity of electricity is not to be measured, is supplied. In the case where the electrolyte to be measured is the positive electrolyte, the working electrode is a positive electrode 214 of the electrolytic cell 21, and the counter electrode is a negative electrode 215 of the electrolytic cell 21. In the case where the electrolyte to be measured is the negative electrolyte, the working electrode is the negative electrode 215 of the electrolytic cell 21, and the counter electrode is the positive electrode 214 of the electrolytic cell 21. A membrane 211 is interposed between the positive electrode 214 and the negative electrode 215 of the electrolytic cell 21. The basic configuration, materials, and the like of the electrolytic cell 21 can be the same as those of the battery cell 10 described above. The electrolytic cell 21 just needs to be able to measure the quantity of electricity required for monitoring the SOC. The size of each of the positive electrode 214 and the negative electrode 215 of the electrolytic cell 21 may be smaller than the electrode surface area of the battery cell 10 (the area of the surface facing the bipolar plate 120 in the electrode). Even when the battery cell 10 is a multi-cell battery, the electrolytic cell 21 may be a single cell. The quantity of electricity is measured by using the electrolyte which is supplied to by use of the circulation mechanism and the like and contained in the working electrode. Accordingly, the amount of electrolyte required for measuring the quantity of electricity may be such an amount that the working electrode can be impregnated with, and can be set to a very small amount (for example, about 0.3 cm$^3$ or more and 2.0 cm$^3$ or less) if the size of the working electrode is decreased. As the amount of electrolyte used to measure the quantity of electricity is decreased (for example, to about 1.0 cm$^3$ or less, or 0.5 cm$^3$ or less), the time for measuring the quantity of electricity can be more easily shortened. Depending on the amount of electrolyte used to measure the quantity of electricity and the like, the electrode surface area of each of the positive electrode 214 and the negative electrode 215 of the electrolytic cell 21 can be adjusted, for example, to about 1 cm$^2$ or more and 9 cm$^2$ or less. The electrolytic cell 21 needs to be arranged such that portions the electrolytes supplied to the battery cell 10 can be supplied thereto.

When the amount of electrolyte to be discharged is set to a very small amount as described above, the time for measuring the quantity of electricity can be shortened. For example, the time for measuring the quantity of electricity can be set to 5 minutes or less, 3 minutes or less, or 2 minutes or less. When the measuring time is very short as described above, the quantity of electricity can be continuously measured by continuously supplying the electrolyte to the electrolytic cell 21. In the RF battery 1 provided with such an electrical quantity measurement system 2, continuous monitoring, real-time data grasping, and the like are possible.

Flow Path

The electrical quantity measurement system 2 includes a flow path in which the same electrolytes as the positive electrolyte and the negative electrolyte supplied to the battery cell 10 from the positive electrolyte tank 16 and the negative electrolyte tank 17 are supplied to the electrolytic cell 21, and after discharging, returned to the positive electrolyte tank 16 and the negative electrolyte tank 17, respectively. FIG. 1 shows the state in which, as will be described later, the electrolyte flow path for the electrolytic cell 21 is connected in parallel to the electrolyte circulation path for the battery cell 10. However, the electrolyte flow path can be connected in series to the electrolyte circulation path, or can be arranged independently from the electrolyte circulation path. In the independent arrangement, for example, pipes for directly supplying the positive and negative electrolytes to the electrolytic cell 21 from the positive electrolyte tank 16 and the negative electrolyte tank 17 may be provided.

The electrolyte flow path for the electrolytic cell 21 shown in this example includes pipes 262 and 264 on the positive electrode side arranged between the electrolytic cell 21 and the pipes 162 and 164 on the positive electrode side constituting the circulation mechanism on the positive electrode side of the battery cell 10, and pipes 272 and 274 arranged between the electrolytic cell 21 and the pipes 172 and 174 constituting the circulation mechanism on the negative electrode side of the battery cell 10.

The pipe 262 on the positive electrode side provided in the electrical quantity measurement system 2 is a pipe for supplying the positive electrolyte to the electrolytic cell 21 and is connected between the pipe 162 on the positive electrode side and the electrolytic cell 21. This example is configured such that the pipe 262 is connected to the downstream side of the pump 160 in the pipe 162 on the positive electrode side, and the positive electrolyte is introduced into the electrolytic cell 21 by the pump 160. However, a pump may be provided separately (the same applies to the negative electrode side which will be described later). The pipe 264 is a pipe for returning the positive electrolyte from the electrolytic cell 21 to the positive electrolyte tank 16 and is connected between the pipe 164 on the positive electrode side and the electrolytic cell 21. This example is configured such that the positive electrolyte is automatically returned to the positive electrolyte tank 16 (the same applies to the negative electrode side which will be described later).

The pipe 272 on the negative electrode side provided in the electrical quantity measurement system 2 is a pipe for supplying the negative electrolyte to the electrolytic cell 21 and is connected between the pipe 172 on the negative electrode side and the electrolytic cell 21. In this example, the pipe 272 is connected to the downstream side of the pump 170 in the pipe 172 on the negative electrode side, and the negative electrolyte is introduced into the electrolytic cell 21 by the pump 170. The pipe 274 is a pipe for returning the negative electrolyte from the electrolytic cell 21 to the negative electrolyte tank 17 and is connected between the pipe 174 on the negative electrode side and the electrolytic cell 21.

Standard Electrode

The standard electrode 20 is disposed, outside the electrolytic cell 21, so as to be in contact with the one electrolyte to be measured, and serves, together with the one electrolyte, as a quasi-reference electrode. In the electrical quantity measurement system 2, unlike Ag/AgCl or the like, which is a commonly used reference electrode, the potential of the one electrolyte to be measured is used as a reference potential for the applied voltage for discharging the one electrolyte. Therefore, a problem due to mixing of the internal solution of the reference electrode with the electrolyte does not occur. However, in the electrical quantity measurement system 2, the reference potential for the applied voltage can change depending on the SOC of the electrolyte and the kind of electrolyte (kind of active material or the like). As a result of studies by the present inventors, the following finding have been obtained. For each kind of electrolyte, a voltage capable of performing total electrolysis of the electrolyte is checked by using a commonly used reference electrode as a reference potential. Usually, depending on the SOC of the electrolyte and the like, voltages in a certain range are capable of performing total electrolysis, and thus, this range is checked. The potential of the electrolyte is checked by using the standard electrode with the commonly used reference electrode as a reference potential. Usually, depending on the SOC of the electrolyte, the potential of the electrolyte changes, and as a result, the potential of the standard electrode varies. Thus, the variation range is checked. Then, the range of voltage that is capable of performing total electrolysis obtained by using the reference electrode as the reference potential (e.g., x volts to y volts, x<y) is checked against the variation range of the potential of the standard electrode (e.g., $\alpha$ volts to $\beta$ volts, $\alpha<\beta$). In this way, a range of voltage that is capable of performing total electrolysis in the case where the standard electrode is used as the reference potential can be set (e.g., $-(\alpha-x)$ volts to $-(\beta-y)$ volts). In such a manner, the range of voltage that is capable of performing total electrolysis is set by obtaining by experiment in advance, and the voltage that is capable of performing total electrolysis is set so as to satisfy the set range on the basis of the potential of the standard electrode to which the one electrolyte to be measured is supplied. When the quantity of electricity is measured, the set voltage is applied to the electrolytic cell 21. It has been found that, in such a manner, the one electrolyte contained in the working electrode can be totally discharged, and the quantity of electricity can be accurately measured. Accordingly, the electrical quantity measurement system 2 is configured to include a quasi-reference electrode formed by the same electrolyte as that to be measured and the standard electrode 20.

From the viewpoint of the usage state (being always in contact with the electrolyte) and the function (acquisition of the potential) of the standard electrode 20, as a constituent material for the standard electrode 20, for example, a conductive material with a low electrical resistance that does not react with electrolytes and has resistance to electrolyte (chemical resistance, acid resistance, and the like) may be used. For example, the standard electrode 20 can include a plate made of a composite material containing a carbon material and an organic material. More specifically, for example, a plate formed of a conductive plastic containing a conductive inorganic material, such as graphite (powder, fibers, or the like), and an organic material, such as a polyolefin-based organic compound or chlorinated organic compound, may be used. As the plate made of such a composite material, a conductive plastic plate used for the bipolar plate 120 may be used. The conductive plastic plate for the bipolar plate 120 is easily available, has a record of long-term use, and has excellent resistance to electrolyte, and therefore, can reduce the replacement frequency of the standard electrode 20, thus being suitable for long-term use.

In the case where only the positive electrolyte is to be measured, the standard electrode 20 can be disposed, outside the electrolytic cell 21, at any position in contact with the positive electrolyte. In the case where only the negative electrolyte is to be measured, the standard electrode 20 can be disposed, outside the electrolytic cell 21, at any position in contact with the negative electrolyte. For example, the standard electrode 20 may be disposed in a portion of the pipe 162 or 164 on the positive electrode side or the pipe 172 or 174 on the negative electrode side that is connected to the positive electrolyte tank 16 or the negative electrolyte tank 17 and the battery cell 10, or the pipe 262 or 264 on the positive electrode side or the pipe 272 or 274 on the negative electrode side that is connected to the electrolytic cell 21.

The electrical quantity measurement system 2 in this example includes both the standard electrode 24 for the positive electrolyte and the standard electrode 25 for the negative electrolyte so that both the SOC of the positive electrolyte and the SOC of the negative electrolyte can be monitored. In this example, branch pipes are provided in the pipes 262 and 272 on the upstream side, and the standard electrode 24 on the positive electrode side and the standard electrode 25 on the negative electrode side are each disposed so as to close an opening on one end of a corresponding one of the branch pipes. By providing a branch pipe, flow of the electrolyte to the electrolytic cell 21 is unlikely to be obstructed, a predetermined amount of electrolyte can be appropriately supplied, and the quantity of electricity can be accurately measured. In addition, arrangement of the standard electrode 20, a sealing operation, and the like can be easily performed. The length of the branch pipe may be short as long as the standard electrode 20 can be brought into contact with the branch pipe, and can be appropriately selected.

Measurement Device

The measurement device 22 is configured to apply, to the electrolytic cell 21, a voltage that is set on the basis of the potential of the standard electrode 20 to which the one electrolyte to be measured is supplied and capable of performing total electrolysis of the one electrolyte contained in the working electrode and measure the quantity of electricity of the one electrolyte. As the measurement device 22, a commercially available potentio/galvanostat can be used. When a commercially available device is used, by preparing the standard electrode 20, the pipes 262, 264, 272, and 274, wires 240, 244, 250, and 255 which will be described later, and the commercially available device and appropriately connecting these components, an electrical quantity measurement system 2 according to Embodiment 1 can be easily constructed.

The positive electrode 214 and the negative electrode 215, which serve as a working electrode or a counter electrode in the electrolytic cell 21, are connected to wires (a wire 244 on the positive electrode side and a wire 255 on the negative electrode side), and ends of the wires are connected to a terminal portion for the working electrode (not shown) and a terminal portion for the counter electrode (not shown) of the measurement device 22. Furthermore, wires (a wire 240 on the positive electrode side and a wire 250 on the negative electrode side) are connected to standard electrodes 20 serving as quasi-reference electrodes, and ends of the wires are connected to terminal portions for the reference electrode (not shown) of the measurement device 22. The working electrode, the counter electrode, the quasi-reference electrodes, and the measurement device 22 are electrically connected through the wires 240, 244, 250, and 255. As a result, the measurement device 22 can apply a predetermined voltage between the working electrode and the counter electrode and deliver and receive electrical signals. An electric wire including a conductor wire, such as a copper wire, can be used as each of the wires 240, 244, 250, and 255.

Flow Rate Adjusting Unit

The electrical quantity measurement system 2 in this example includes flow rate adjusting units 284 and 285 for adjusting the flow rate of an electrolyte to a working electrode. As each of the flow rate adjusting units 284 and 285, an appropriate adjusting mechanism, a valve (e.g., a relief valve), or the like can be used. In a valve, such as a relief valve, the flow rate can be easily adjusted, and for example, when the quantity of electricity is measured, supply of the electrolyte can be easily stopped temporarily.

SOC Computing Unit

Furthermore, the electrical quantity measurement system 2 can be provided with an SOC computing unit 23 that computes the SOC on the basis of the measured quantity of electricity. As the SOC computing unit 23, a commercially available computer or the like can be used. Although FIG. 1 shows the state in which the SOC computing unit 23 is externally attached to the measurement device 22, the SOC computing unit 23 can be built into the measurement device 22. By providing the SOC computing unit 23, the process from measurement of the quantity of electricity to computation of the SOC can be automatically performed, and the operator can easily grasp the SOC.

The SOC can be obtained from the formula α below by using the measured quantity of electricity.

$$SOC(\%)=[Q/(c \times V \times F)] \times 100 \quad \text{formula } \alpha$$

In the formula α, Q is the quantity of electricity (C), c is the concentration of the active material (mol/L), V is the volume (L) of the electrolyte contained in the working electrode, and F is the Faraday constant (C/mol). The unit of measure "L" denotes liter.

As shown in the formula α, since the SOC is univocally determined by the quantity of electricity Q, the quantity of electricity Q itself can be used as a parameter for monitoring the SOC. In this case, the SOC computing unit 23 can be omitted.

Measurement Procedure

A procedure of measuring the quantity of electricity by the electrical quantity measurement method according to Embodiment 1 or the electrical quantity measurement system 2 according to Embodiment 1 will be described below by using, as an example, the case where the electrolyte in which the SOC is to be monitored is the positive electrolyte. In the case where the electrolyte in which the SOC is to be monitored is the negative electrolyte, "positive" may be appropriately read as "negative" in the following description.

In this example, when a predetermined pressure is applied to each of the flow rate adjusting units 284 and 285 constituted by valves, such as relief valves, the valves are opened. The positive electrolyte is supplied at a predetermined flow rate through the pipes 162 and 262 on the positive electrode side to the positive electrode 214 of the electrolytic cell 21, and the negative electrolyte is supplied at a predetermined flow rate through the pipes 172 and 272 on the negative electrode side to the negative electrode 215 of the electrolytic cell 21. When the pressure is decreased as the electrolytes are supplied, the valves are closed, and flow of the electrolytes inside the electrolytic cell 21 is stopped (becomes stationary). The measurement device 22 discharges the predetermined amount of positive electrolyte by applying a set voltage to the electrolytic cell 21 having the electrolytes supplied thereto, the set voltage being set on the basis of the potential of a standard electrode 20 (standard electrode 24 on the positive electrode side) disposed in contact with the one electrolyte (positive electrolyte) to be monitored. The set voltage is a voltage that is capable of performing total electrolysis of the positive electrolyte (predetermined amount of electrolyte) contained in the positive electrode 214 which is a working electrode. The voltage can be applied between the working electrode (positive electrode 214) and the counter electrode (negative electrode 215) of the electrolytic cell 21 through the wires 244 and 255. The measurement device 22 measures the quantity of electricity when the predetermined amount of positive electrolyte is totally discharged by constant-potential electrolysis with the applied voltage. It is possible to grasp the magnitude of the charging degree of the positive electrolyte. When the measured quantity of electricity is checked against the formula α or computed by the SOC computing unit 23, the SOC of the positive electrolyte at this time can be grasped.

After discharging, the positive electrolyte is returned to the positive electrolyte tank 16 through the pipes 264 and 164 on the positive electrode side. At this time, since the positive electrolyte stored in the positive electrolyte tank 16 is mixed with the returned positive electrolyte after discharging (discharged liquid), strictly speaking, the SOC can vary. However, when the amount of electrolyte used for measuring the quantity of electricity is set to a very small amount as described above, the variation in the SOC due to mixing of the discharged liquid can be substantially ignored.

In the case where the SOC is to be monitored in both positive and negative electrolytes, measurement may be performed one by one. For example, in the case where measurement is performed every two minutes, in the nth measurement, the positive electrode 214 is set as the working electrode, and a voltage that is required for total electrolysis of the positive electrolyte is applied. In the next (n+1)th measurement, the working electrode is switched to the negative electrode 215, and a voltage that is required for total electrolysis of the negative electrolyte is applied. In such a manner, the SOCs of the positive and negative electrolytes can be grasped every four minutes.

(Application)

The RF battery 1 according to Embodiment 1 has advantages such as (1) ease of capacity increase to a megawatt (MW) level, (2) a long life, (3) capability of accurately monitoring the SOC, and (4) high design freedom such that battery output and battery capacity can be independently designed. Such an RF battery 1 according to the embodiment can be used as a storage battery, with respect to power generation by natural energy, such as solar photovoltaic power generation or wind power generation, for the purpose of stabilizing variation of power output, storing generated power during oversupply, load leveling, and the like. Furthermore, the RF battery 1 can be provided in a general power plant and used as a storage battery, for stabilizing a power system, as countermeasures against instantaneous power failure/power failure and, for the purpose of load leveling. The electrical quantity measurement system 2 according to Embodiment 1 can be provided in an RF battery and used to monitor the SOC. The electrical quantity measurement method according to Embodiment 1 can be used to monitor the SOC in an RF battery.

(Advantageous Effects)

The RF battery 1 according to Embodiment 1 includes the electrical quantity measurement system 2 according to Embodiment 1 including the electrolytic cell 21, in which the standard electrode 20 and the electrolyte to be measured are used as a quasi-reference electrode, and the quantity of electricity is measured by a coulometric method. In such an RF battery 1 according to Embodiment 1, unlike the case where a commonly used reference electrode is used, a reference potential that regulates the potential of the working electrode can be appropriately obtained over a long period of time. The electrolyte contained in the working electrode of the electrolytic cell 21 can be discharged neither excessively nor insufficiently, and the quantity of electricity can be measured with high accuracy. Furthermore, since the RF battery 1 according to Embodiment 1 is configured as an in-line system including the electrical quantity measurement system 2, the time for measuring the quantity of electricity can be easily shortened, and by adjusting the size of the working electrode, the amount of electrolyte used to measure the quantity of electricity can be controlled to a very small amount. Therefore, the quantity of electricity can be continuously measured. Accordingly, in the RF battery 1 according to Embodiment 1, the SOC can be obtained with high accuracy on the basis of the measured quantity of electricity, and the SOC can be accurately, continuously monitored over a long period of time.

When the electrical quantity measurement system 2 according to Embodiment 1 is incorporated into the RF battery 1, as described above, the measurement system 2 can be used to accurately, continuously monitor the SOC over a long period of time. When the electrical quantity measurement method according to Embodiment 1 is applied to the RF battery 1 or the like, as described above, the method can be used to accurately, continuously monitor the SOC over a long period of time.

In the RF battery 1 according to Embodiment 1 or the RF battery including the electrical quantity measurement system 2 according to Embodiment 1, by monitoring a SOC, operating conditions and the like can be adjusted on the basis of the SOC (or quantity of electricity). Therefore, for example, the RF battery is expected to contribute to enhancing reliability by preventing overcharging and overdischarging, and controlling operation more efficiently by optimizing operating conditions for output stabilization and load leveling. Furthermore, as in this example, in the case where both the SOC of the positive electrolyte and the SOC of the negative electrolyte can be monitored, even when a difference occurs between the SOCs of the two electrolytes, operating conditions and the like can be adjusted so as to promptly correct the difference. Therefore, it is expected that overcharging, overdischarging, and other problems due to occurrence of a large difference between the SOCs of the two electrolytes can be prevented.

TEST EXAMPLE 1

An RF battery according to Embodiment 1 was constructed. The quantity of electricity was measured by an electrical quantity measurement system, and the SOC obtained from the measured quantity of electricity was compared to the theoretical value of the SOC. In this example, the quantity of electricity of the positive electrolyte was measured.

(Battery Cell)

In this example, each of the positive electrode and the negative electrode provided in the battery cell of the RF battery is a commercially available felt electrode with an electrode surface area of 500 $cm^2$. The membrane is a commercially available anion-exchange membrane.

(Electrolyte)

In this example, Mn/Ti-based electrolytes were used as electrolytes. The positive electrolyte is an aqueous sulfuric acid solution containing manganese ions, in which the manganese ion concentration is 1.0 M, and the sulfate ion concentration is 5.0 M. The negative electrolyte is an aqueous sulfuric acid solution containing titanium ions, in which the titanium ion concentration is 1.0 M, and the sulfate ion concentration is 5.0 M. The unit of measure "M" of the concentration means the volume molar concentration.

(Electrical Quantity Measurement System)

The positive electrode, the membrane, and the negative electrode provided in the electrolytic cell are commercial items and made of the same materials as those of the battery cell, but have different sizes. The electrode surface area of each of positive and negative electrodes is 1 $cm^2$.

As the standard electrode, a conductive plastic plate used for the bipolar plate in the battery cell of the RF battery was used. In this example, two conductive plastic plates were prepared, one end of a wire was sandwiched between the two plates, and the other end of the wire was connected to the measurement device.

As the flow rate adjusting unit, a commercially available valve was used.

As the measurement device, a commercially available potentio/galvanostat (manufactured by Solartron Corp., 8 ch Multistat 1470E) was used.

While changing the SOC by charging the battery cell, the quantity of electricity charged (C) was measured. By using the measured value, the SOC (theoretical value) was obtained from the formula below. The results are shown in Table 1.

Theoretical value of SOC=quantity of electricity charged/theoretical capacity

Theoretical capacity=number of electrons involved in reaction×volume of electrolyte×molar concentration×Faraday constant In this example, conditions for measuring the quantity of electricity were as follows: temperature: 25° C., and amount of electrolyte used to measure the quantity of electricity: 0.34 cm³. A voltage capable of performing total electrolysis of the positive electrolyte was set on the basis of the standard electrode on the positive electrode side (in this example, selected from the range of −1.1 V to −0.7 V). By applying the set voltage to the electrolytic cell, the positive electrolyte contained in the working electrode (0.34 cm³ in this example) was discharged, and the quantity of electricity Q (C) was measured. In this example, the measurement was ended either when the amount of current (mA) flowing during discharging was checked and the amount of current reached "−5 mA" or when the voltage application time (t) was measured and reached "300 seconds". The measurement results are shown in Table 1. The SOC obtained by substituting the measured quantity of electricity Q into the formula α is shown as the SOC (measured value) in Table 1.

Figure 3:
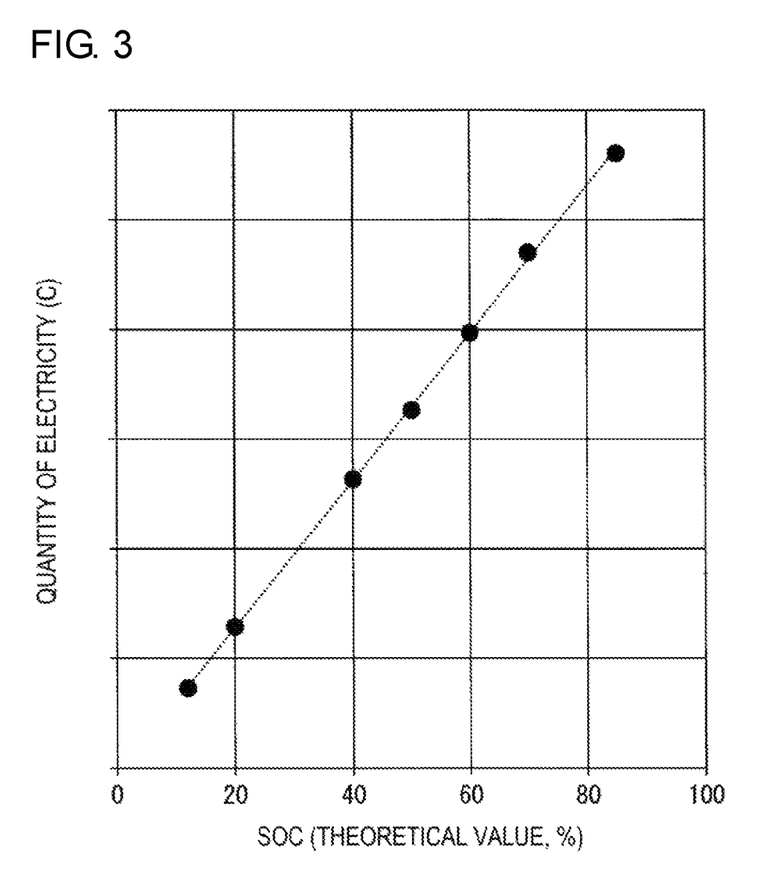
FIG. 3 is a graph showing the relationship between the quantity of electricity measured in Test Example 1 and the theoretical value of the state of charge (SOC).
Figure 4:
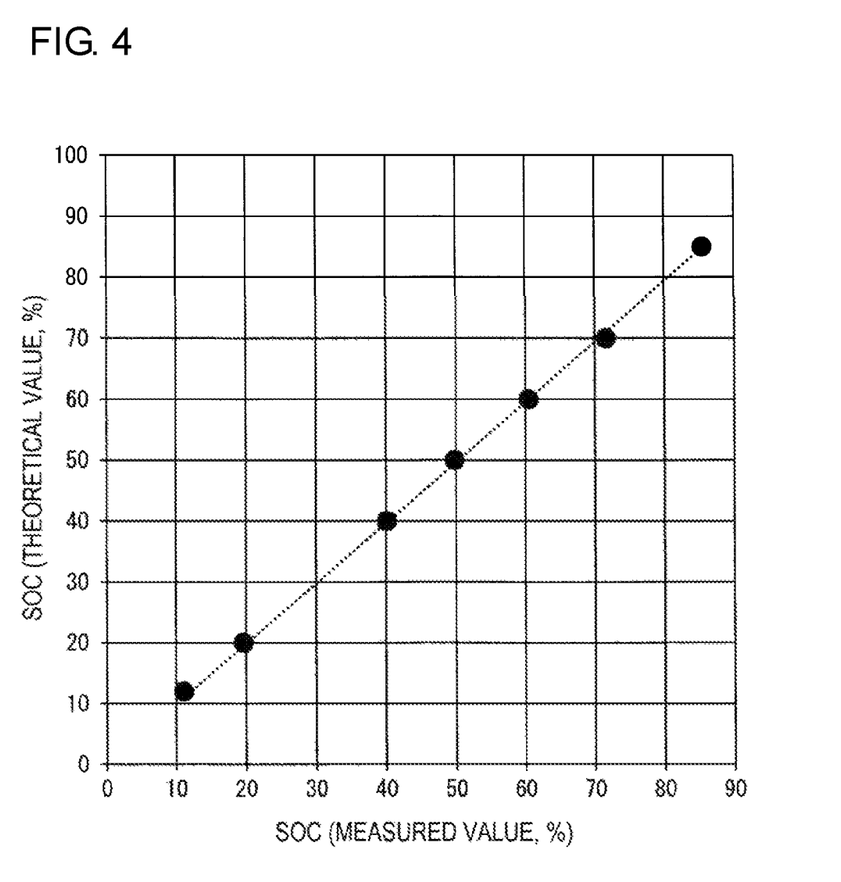
FIG. 4 is a graph showing the relationship between the measured value of the state of charge (SOC) obtained on the basis of the quantity of electricity measured in Test Example 1 and the theoretical value of the state of charge (SOC).

Furthermore, FIG. 3 shows the relationship between the SOC (theoretical value, %) and the measured quantity of electricity Q (C), and FIG. 4 shows the relationship between the SOC (measured value, %) and the SOC (theoretical value, %). In FIG. 3, the horizontal axis represents the SOC (theoretical value, %), and the vertical axis represents the quantity of electricity (C). In FIG. 4, the horizontal axis represents the SOC (measured value, %), and the vertical axis represents the SOC (theoretical value, %).

TABLE 1

| SOC (theoretical value) (%) | Quantity of electricity Q (C) | SOC (measured value) (%) | Error (%) measured value − theoretical value |
|---|---|---|---|
| 85 | −28.037 | 85.5 | +0.5 |
| 70 | −23.497 | 71.6 | +1.6 |
| 60 | −19.859 | 60.5 | +0.5 |
| 50 | −16.328 | 49.8 | −0.2 |
| 40 | −13.167 | 40.1 | +0.1 |
| 20 | −6.441 | 19.6 | −0.4 |
| 12 | −3.6254 | 11.1 | −0.9 |

As shown in Table 1 and FIG. 3, the SOC (theoretical value) and the quantity of electricity Q correlate with each other, and are substantially in proportion to each other. Furthermore, as shown in Table 1 and FIG. 4, the SOC (measured value) and the SOC (theoretical value) correlate with each other, and are substantially in direct proportion to each other. In this test, the maximum error between the SOC (measured value) and the SOC (theoretical value) is 1.6%, and the mean error is very small, 0.17%. The results show that the measured quantity of electricity Q and the SOC (measured value) obtained on the basis of the quantity of electricity Q are parameters that indicate the SOC in the RF battery with high accuracy, and can be suitably used as parameters for monitoring the SOC.

Furthermore, in the RF battery according to Embodiment 1 and the RF battery including the electrical quantity measurement system according to Embodiment 1, the potential of the electrolyte itself is used as a reference for the applied voltage for totally discharging a predetermined amount of electrolyte in measuring the quantity of electricity of the electrolyte. Therefore, over long-term use, sudden decreases in the potential of the reference electrode as shown in FIGS. 5 and 6 do not substantially occur. This shows that, in the RF battery according to Embodiment 1, the RF battery including the electrical quantity measurement system according to Embodiment 1, and the RF battery to which the electrical quantity measurement method according to Embodiment 1 is applied, over a long period of time, the quantity of electricity can be measured with high accuracy, and the SOC can be accurately monitored. Regarding the graphs of FIGS. 5 and 6, the Mn/Ti-based electrolyte used in this test was charged to obtain a charged liquid in which the SOC was 20%, a Ag/AgCl electrode (refer to FIG. 5) or Hg/Hg$_2$SO$_4$ electrode (refer to FIG. 6) was brought into contact with the charged liquid, while maintaining that state, the potential of this reference electrode was measured over time (measurement temperature 25° C.), and the results are shown in the graphs. In this test, during measurement of the potential, generation of chlorine gas from the Ag/AgCl electrode was observed. From this point, it is considered that the Ag/AgCl electrode is not suited for long-term use.

The scope of the present invention is not limited to the exemplary embodiments but is defined by the appended claims, and is intended to include all modifications within the meaning and scope equivalent to those of the claims. For example, the following modifications are possible.

(1) Embodiment 1 is configured such that both the positive electrolyte and the negative electrolyte are monitored, and the standard electrode 24 for the positive electrolyte and the standard electrode 25 for the negative electrolyte are provided. However, in the case where one of the positive electrolyte and the negative electrolyte is monitored, one of the standard electrodes 20 may be provided.

(2) In Test Example 1, Mn/Ti-based electrolytes were used. However, the electrolytes can be changed to V-based electrolytes, Fe/Cr-based electrolytes, and other electrolytes.

The invention claimed is:

1. A redox flow battery comprising:
a battery cell to which a positive electrolyte and a negative electrolyte are supplied; and
an electrical quantity measurement system configured to measure a quantity of electricity when a predetermined amount of at least one of the positive electrolyte and the negative electrolyte is discharged,
wherein the electrical quantity measurement system includes:
an electrolytic cell having a working electrode to which one of the positive electrolyte and the negative electrolyte, in which the quantity of electricity is to be measured, is supplied, and a counter electrode to which the other electrolyte, which is not to be measured, is supplied;
a standard electrode disposed, outside the electrolytic cell, so as to be in contact with the one electrolyte to be measured; and
a measurement device configured to apply, to the electrolytic cell, a voltage that is set on the basis of a potential of the standard electrode and configured to perform total electrolysis of the one electrolyte contained in the working electrode and measure the quantity of electricity of the one electrolyte.

2. The redox flow battery according to claim 1, wherein the standard electrode includes a plate made of a composite material containing a carbon material and an organic material.

3. The redox flow battery according to claim 1, wherein the positive electrolyte contains manganese ions.

4. The redox flow battery according to claim 1, wherein the negative electrolyte contains titanium ions.

5. The redox flow battery according to claim 1, wherein the measurement device is further configured to calculate a state of charge (SOC) based on the measured quantity of electricity.

6. The redox flow battery according to claim 5, wherein the measurement device includes a computer configured to calculate the SOC.

7. The redox flow battery according to claim 6, wherein the computer is configured to calculate the SOC according to $$SOC(\%)=[Q/(c \times V \times F)] \times 100,$$

where Q is the quantity of electricity in coulombs, c is a concentration of active material in mol/L, V is a volume in liters of the electrolyte contained in the working electrode, and F is the Faraday constant in C/mol.

8. An electrical quantity measurement system which is configured to measure a quantity of electricity when a predetermined amount of at least one of a positive electrolyte and a negative electrolyte supplied to a battery cell of a redox flow battery is discharged, the electrical quantity measurement system comprising:
an electrolytic cell having a working electrode to which one of the positive electrolyte and the negative electrolyte, in which the quantity of electricity is to be measured, is supplied, and a counter electrode to which the other electrolyte, which is not to be measured, is supplied;
a standard electrode disposed, outside the electrolytic cell, so as to be in contact with the one electrolyte to be measured; and
a measurement device configured to apply, to the electrolytic cell, a voltage that is set on the basis of a potential of the standard electrode and configured to perform total electrolysis of the one electrolyte contained in the working electrode and measure the quantity of electricity of the one electrolyte.

9. The electrical quantity measurement system according to claim 8, wherein the standard electrode includes a plate made of a composite material containing a carbon material and an organic material.

10. The electrical quantity measurement system according to claim 8, wherein the positive electrolyte contains manganese ions.

11. The electrical quantity measurement system according to claim 8, wherein the negative electrolyte contains titanium ions.

12. The electrical quantity measurement system according to claim 8, wherein the measurement device is further configured to calculate a state of charge (SOC) based on the measured quantity of electricity.

13. The electrical quantity measurement system according to claim 12, wherein the measurement device includes a computer configured to calculate the SOC.

14. The electrical quantity measurement system according to claim 13, wherein the computer is configured to calculate the SOC according to $$SOC(\%)=[Q/(c \times V \times F)] \times 100,$$

where Q is the quantity of electricity in coulombs, c is a concentration of active material in mol/L, V is a volume in liters of the electrolyte contained in the working electrode, and F is the Faraday constant in C/mol.

15. An electrical quantity measurement method comprising:
supplying one of a positive electrolyte and a negative electrolyte of a battery cell of a redox flow battery to a working electrode which constitutes an electrolytic cell that is independent from the battery cell, and supplying the other electrolyte to a counter electrode which constitutes the electrolytic cell; and
measuring a quantity of electricity when the one electrolyte contained in the working electrode is discharged by applying a set voltage to the electrolytic cell having the electrolytes supplied thereto,
wherein the set voltage is a voltage that is based on a potential of a standard electrode disposed, outside the electrolytic cell, so as to be in contact with the one electrolyte and configured to perform total electrolysis of the one electrolyte contained in the working electrode.

16. The electrical quantity measurement method of claim 15, wherein the standard electrode includes a plate made of a composite material containing a carbon material and an organic material.

17. The electrical quantity measurement method of claim 15, wherein the positive electrolyte contains manganese ions, and the negative electrolyte contains titanium ions.

18. The electrical quantity measurement method of claim 15, further comprising:
calculating a state of charge (SOC) based on the measured quantity of electricity.

19. The electrical quantity measurement method of claim 18, wherein the calculating comprises calculating with a computer.

20. The electrical quantity measurement method of claim 18, wherein
the calculating comprises calculating the SOC according to $$SOC(\%)=[Q/(c \times V \times F)] \times 100,$$

where Q is the quantity of electricity in coulombs, c is a concentration of active material in mol/L, V is a volume in liters of the electrolyte contained in the working electrode, and F is the Faraday constant in C/mol.

* * * * *